(12) United States Patent
Li et al.

(10) Patent No.: US 12,516,155 B2
(45) Date of Patent: Jan. 6, 2026

(54) METHOD OF SYNTHESIZING POLYLACTIC ACID AND CATALYST THEREOF

(71) Applicant: Plastics Industry Development Center, Taichung (TW)

(72) Inventors: Chen-Yu Li, Taichung (TW); Po-Han Li, Taichung (TW); Yu-Li Lee, Taichung (TW)

(73) Assignee: Plastics Industry Development Center, Taichung (TW)

( * ) Notice: Subject to any disclaimer, the term of this patent is extended or adjusted under 35 U.S.C. 154(b) by 456 days.

(21) Appl. No.: 17/977,335

(22) Filed: Oct. 31, 2022

(65) Prior Publication Data

US 2024/0084072 A1    Mar. 14, 2024

(30) Foreign Application Priority Data

Aug. 30, 2022  (TW) .................................. 111132655

(51) Int. Cl.
*C08G 63/85*    (2006.01)
*C07F 7/22*    (2006.01)
*C08G 63/08*    (2006.01)

(52) U.S. Cl.
CPC ............ *C08G 63/85* (2013.01); *C07F 7/2284* (2013.01); *C08G 63/08* (2013.01)

(58) Field of Classification Search
CPC ..................................................... C08G 63/85
(Continued)

(56) References Cited

U.S. PATENT DOCUMENTS

| | | | |
|---|---|---|---|
| 2016/0075821 A1* | 3/2016 | Gobius Du Sart et al. | ................ C08G 63/85 |
| 2017/0342204 A1* | 11/2017 | Lee et al. | ............... C08G 63/08 |

FOREIGN PATENT DOCUMENTS

WO    WO 2007/074093    *  7/2007

* cited by examiner

*Primary Examiner* — Randy P Gulakowski
(74) *Attorney, Agent, or Firm* — Apex Juris, pllc; R. Lynette Wylie

(57) ABSTRACT

A compound of formula (1), wherein R1, R2, R3 are defined in the disclosure. The compound of formula (1) is used as a catalyst for lactide polymerization to reduce the temperature and the time of the polymerization reaction, thereby producing polylactic acid (PLA) having high molecular weight. The present invention also provides a method of preparing the compound of formula (1) and a method of synthesizing polylactic acid that is catalyzed by the compound of formula (1).

19 Claims, 5 Drawing Sheets

(58) Field of Classification Search
USPC .......................................................... 528/357
See application file for complete search history.

METHOD OF SYNTHESIZING POLYLACTIC ACID AND CATALYST THEREOF

BACKGROUND OF THE INVENTION

Technical Field

The present invention relates generally to a synthesis of polylactic acid (PLA), and more particularly to a method of synthesizing PLA and a catalyst thereof.

Description of Related Art

Recently, the biodegradable polymer is a popular issue in a field of fundamental research and a field of the chemical industry, especially polylactic acid (PLA). PLA has good mechanical properties, biodegradability, and biocompatibility, so PLA has been widely applied in fields of tissue engineering, medical device, packaging, and so on.

So far, the PLA is usually synthesized by a ring-opening polymerization (ROP), including a step of oligopolymerization and depolymerization of lactate to obtain lactide, and a step of polymerization of lactide to synthesize PLA. During the PLA synthesis, a metal carboxylate catalyst, such as carboxylates, oxides, and alkoxides of tin, zinc, and aluminum, can be used to catalyze the polymerization of lactide. So far, there are a few commercial catalysts, such as tin(II) 2-ethylhexanoate (stannous octoate, $Sn(Oct)_2$) and tin(II) chloride ($SnCl_2$), for the polymerization of lactide. However, the polymerization of lactide can not carry out at a temperature lower than 180 Celsius degrees (° C.) in a presence of the conventional catalyst. In case, the polymerization is reluctantly carried out at a temperature lower than 180° C., a reaction time of polymerization (namely time spent for synthesizing PLA) will be at least excess of 15 hours, the synthesized PLA has a lower molecular weight, and a conversion of lactide is low. In such a situation, after the polymerization, an additional purifying process is necessary to separate the synthesized PLA from residual lactide. Thus, the conventional method of synthesizing PLA is complex and expensive, which is not beneficial for mass production.

Therefore, the conventional method of synthesizing PLA and the conventional catalyst has room for improvement.

BRIEF SUMMARY OF THE INVENTION

In view of the above, the primary objective of the present invention is to provide a method of synthesizing polylactic acid (PLA) and a catalyst thereof, wherein the method of synthesizing PLA and the catalyst could increase a purity of synthesized PLA (namely a conversion of polymerization is increased). Besides, the method of synthesizing PLA could be performed at a low temperature to yield PLA having a high molecular weight within a short period of time, thereby increasing the yield of PLA and reducing the energy consumed used in the method of synthesizing PLA.

The present inventive subject matter provides a compound having a structure of formula (1), wherein $R_1$ is selected from a group consisting of hydrogen and a hydrocarbon functional group with a number of carbon atoms from 1 to 9; $R_2$ is selected from a group consisting of a hydrocarbon functional group with a number of carbon atoms from 1 to 9; $R_3$ is hydrogen or chlorine.

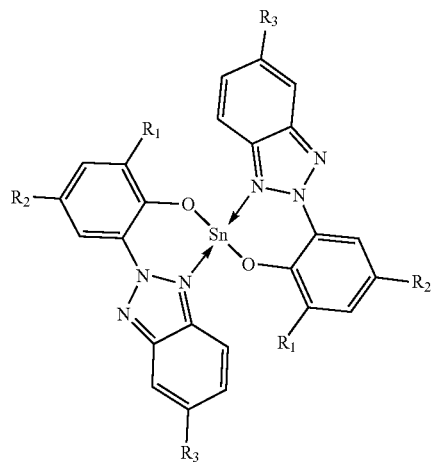

Formula (1)

The present inventive subject matter provides a process of preparing the compound having a structure of formula (1), including:

A compound having a structure of formula (2) is reacted with a tin(II) compound in a solvent to synthesize the compound having a structure of formula (1);

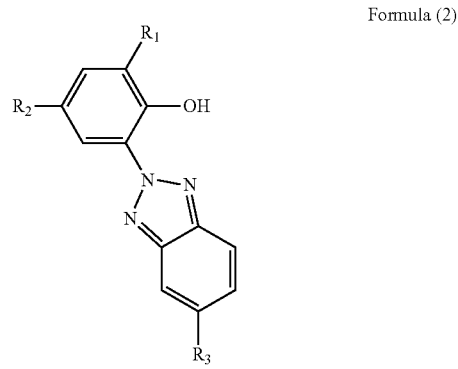

Formula (2)

wherein $R_1$ is selected from a group consisting of hydrogen and a hydrocarbon functional group with a number of carbon atoms from 1 to 9; $R_2$ is selected from a group consisting of a hydrocarbon functional group with a number of carbon atoms from 1 to 9; $R_3$ is hydrogen or chlorine. At the beginning of the reaction, an equivalent ratio of the compound having the structure of formula (2) to the tin(II) compound is from 2:1 to 8:1.

The present inventive subject matter provides a method of synthesizing polylactic acid (PLA), including:

Perform a ring-opening polymerization of lactide in a presence of a catalyst having a structure of formula (1) to synthesize PLA, wherein $R_1$ of formula (1) is selected from a group consisting of hydrogen and a hydrocarbon functional group with a number of carbon atoms from 1 to 9; $R_2$ of formula (1) is selected from a group consisting of a hydrocarbon functional group with a number of carbon atoms from 1 to 9; $R_3$ of formula (1) is hydrogen or chlorine.

The present inventive subject matter provides another method of synthesizing PLA, including:

A) A ligand having a structure of formula (2) and a tin compound are added into a reaction vessel to synthesize a catalyst having a structure of formula (1), wherein R₁ of formula (2) is selected from a group consisting of hydrogen and a hydrocarbon functional group with a number of carbon atoms from 1 to 9; R₂ of formula (2) is selected from a group consisting of a hydrocarbon functional group with a number of carbon atoms from 1 to 9; R₃ of formula (2) is hydrogen or chlorine; the functional groups R₁, R₂, and R₃ of formula (1) is the same as the formula (2).

B) Lactide is added into the reaction vessel to perform a ring-opening polymerization to synthesize PLA.

By using the catalyst having the structure of formula (1) provided in the present invention, the polymerization of lactide could be performed at a low temperature to rapidly synthesize the PLA with high molecular weight, thereby reducing the energy, time, and cost consumed for synthesis PLA. Additionally, the conversion of lactide is significantly promoted, so that an additional purifying process is no longer needed to isolate the synthesized PLA, thereby simplifying the method of synthesizing PLA.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

For the purposes of explanation, numerous specific details are set forth in order to provide a thorough understanding of the present invention. However, it will be apparent to one skilled in the art that the invention may be practiced without these specific details I. Catalyst for Catalyzing a Ring-Opening Polymerization (ROP)

A compound having a structure of formula (1), wherein R₁ is selected from a group consisting of hydrogen and a hydrocarbon functional group with a number of carbon atoms from 1 to 9; R₂ is selected from a group consisting of a hydrocarbon functional group with a number of carbon atoms from 1 to 9; R₃ is hydrogen or chlorine.

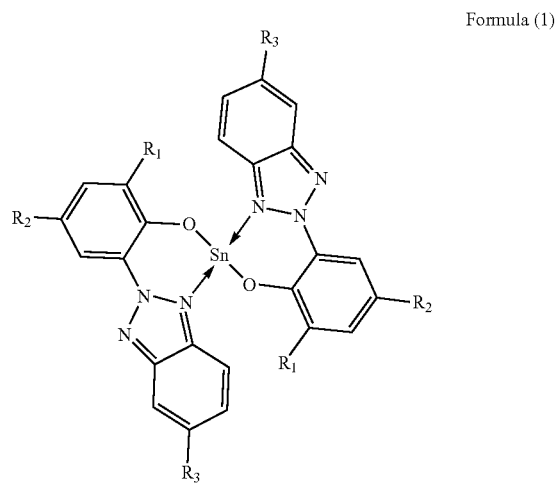

Formula (1)

As used herein, the term "hydrocarbon functional group" refers to alkyl group, alkenyl group, alkynyl group, and aryl group.

The compound having a structure of formula (1) is a tin complex containing bis-(benzotriazole phenoxide) ligands and could be used as a catalyst for catalyzing the ring-opening polymerizations (ROP), such as a ROP of lactide for synthesizing polylactic acid (PLA) and a ROP of caprolactone for synthesizing polycaprolactone (PCL). Thus, the compound having a structure of formula (1) is referred to as "catalyst ($^R$BTP)₂Sn") hereinafter. Additionally, the benzotriazole phenoxide (BTP) ligand is a N,O-bidentate ligand, which means each of the BTP ligands has an N atom and an O atom to bind to a central metal (namely, Zn).

Figure 1:
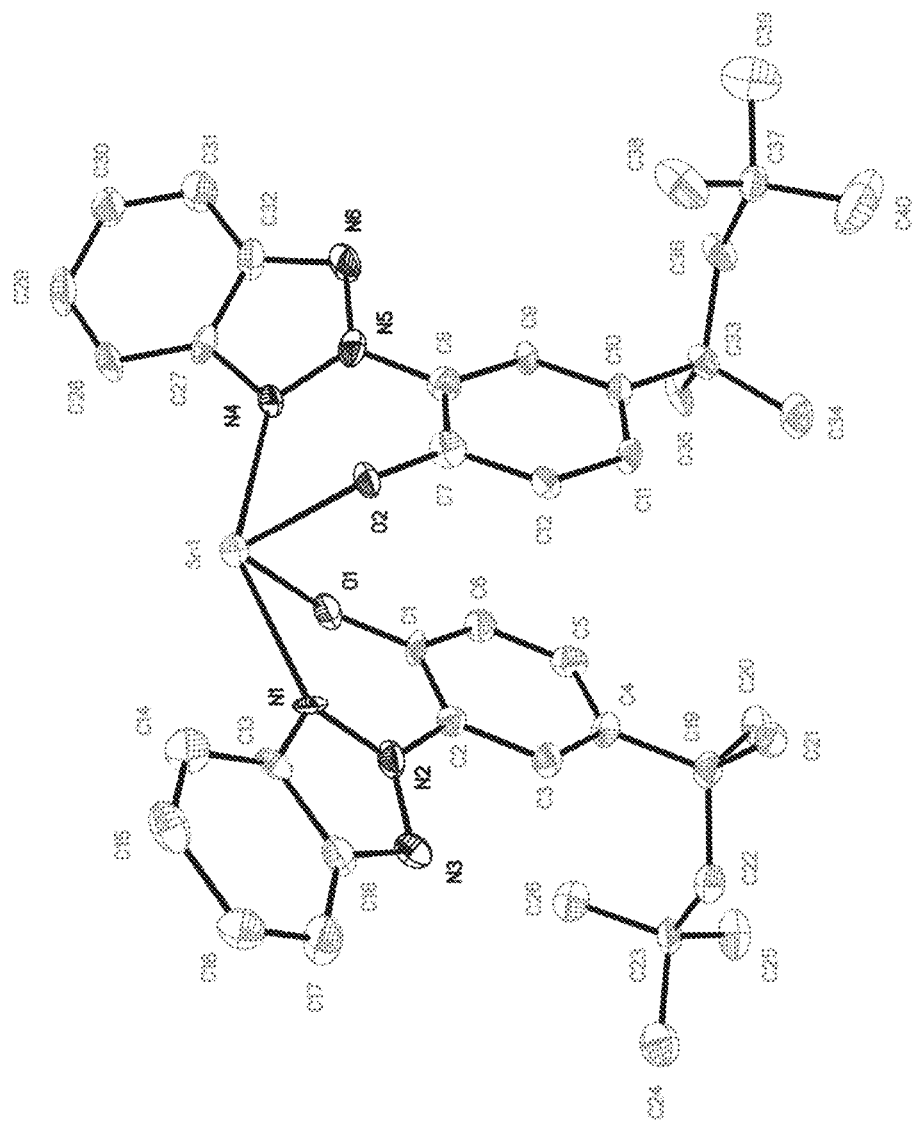
FIG. 1 is an ORTEP diagram, showing the molecular structure of the ($^{C8}$BTP)₂Sn catalyst.

In an embodiment, for a compound having formula (1), where R₁ is hydrogen (H), R₂ is octyl (—C8H17), R₃ is H, the compound is referred to as a catalyst ($^{C8}$BTP)₂Sn, wherein the molecular structure of the catalyst ($^{C8}$BTP)₂Sn is shown in FIG. 1. In an embodiment, for a compound having formula (1), where R₁ is H, R₂ is methyl (-Me or —CH₃), R₃ is H, the compound is referred to as a catalyst ($^{Cl}$BTP)₂Sn. In an embodiment, for a compound having formula (1), where R₁ is tert-Butylphenyl (-tBu), R₂ is -Me, R₃ is chlorine (CI), the compound is referred to as a catalyst ($^{TMCl}$BTP)₂Sn. In an embodiment, for a compound having formula (1), where R₁ is propylphenyl (—C3H6Ph), R₂ is —C3H6Ph, R₃ is H, the compound is referred to as a catalyst ($^{C3Ph}$BTP)₂Sn. In an embodiment, for a compound having formula (1), where R₁ is -tBu, R₂ is -tBu, R₃ is Cl, the compound is referred to as a catalyst ($^{TTCl}$BTP)₂Sn. In an embodiment, for a compound having formula (1), where R₁ is -tBu, R₂ is -tBu, R₃ is H, the compound is referred to as a catalyst ($^{tBu}$BTP)₂Sn. In an embodiment, for a compound having formula (1), where R₁ is butyl (—C4H9), R₂ is -tBu, R₃ is H, the compound is referred to as a catalyst ($^{C4}$BTP)₂Sn.

II. Synthesis of the Catalyst ($^R$BTP)₂Sn

A process of preparing the compound having a structure of formula (1) includes the following steps.

A compound having a structure of formula (2) in an amount of 2-8 equivalents and a tin(II) compound (SnA₂) in an amount of 1-4 equivalents are reacted in a solvent to synthesize the compound having the structure of formula (1) (namely, the catalyst ($^R$BTP)₂Sn). A reaction equation of synthesis of the compound having formula (1) is shown below.

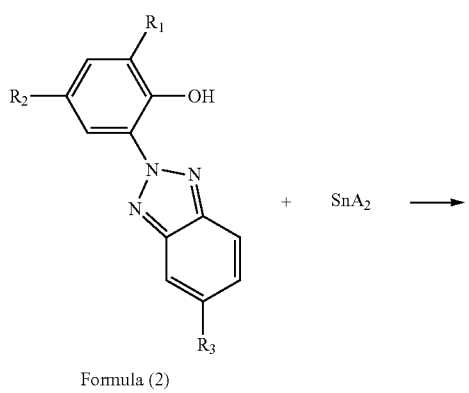

Formula (2)

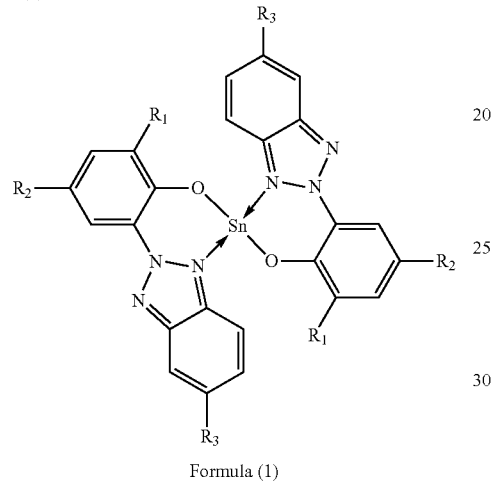

Formula (1)

The compound having the structure of formula (2) is the benzotriazole phenoxide ligand, referred to as "$^R$BTP-H" hereinafter, wherein $R_1$ is selected from a group consisting of hydrogen and a hydrocarbon functional group with a number of carbon atoms from 1 to 9; $R_2$ is selected from a group consisting of a hydrocarbon functional group with a number of carbon atoms from 1 to 9; $R_3$ is hydrogen or chlorine.

In the reaction equation of synthesis of the compound having formula (1), the tin compound is a tin(II) compound. Since a reactivity of tin(II) is greater than a reactivity of tin (IV), the tin(II) compound is more easily to react with other substances. Thus, using the tin(II) compound to synthesize the compound having formula (1) could obtain a better result (e.g. increasing the amount of the product). The tin(II) compound is selected from a group consisting of tin(II) 2-ethylhexanoate, tin(II) bis[bis(trimethylsilyl)amino], tin (II) chloride, and tin(II) sulfate.

Additionally, in the reaction equation of synthesis of the compound having formula (1), an equivalent ratio of reactants, namely an equivalent ratio of the compound having the structure of formula (2) to the tin(II) compound, is from 2:1 to 8:1, preferably 2:1 to 2.5:1.

Generally, the synthesis reaction of the compound having formula (1) is performed under 1 atm at a temperature between 40 Celsius degrees (° C.) and 120 Celsius degrees (° C.) for 12-16 hours. Preferably, the temperature of the synthesis reaction is in a range of 40° C. to 50° C. When the temperature of the synthesis reaction is higher than 120° C., the synthesis reaction could still be performed, and, however, a stability of the synthesized compound having formula (1) is reduced. Thus, performing the synthesis reaction at a temperature higher than 120° C. is energy-consuming, and the synthesis result could merely maintain or become worse. When the temperature of the synthesis reaction is less than 40° C., the compound having formula (1) is hard to be synthesized.

The solvent of the synthesis reaction is selected from a group consisting of toluene, ethyl ethanoate, n-hexane, diethyl ether, and tetrahydrofuran. The moisture content of the solvent is smaller than or equal to 200 ppm.

Various compounds having formula (1) are synthesized by using different compounds having formula (2), wherein the compounds having formula (2), includes but not limited to, $^{C8}$BTP-H, $^{Cl}$BTP-H, $^{TMCl}$BTP-H, $^{C3Ph}$BTP-H, $^{TTCl}$BTP-H, $^{tBu}$BTP-H, and $^{C4}$BTP-H, and the structural formula thereof are listed below:

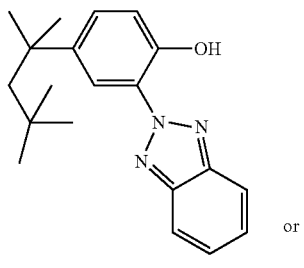

or $^{C8}$BTP-H

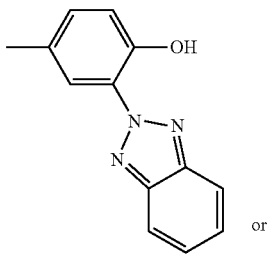

or $^{Cl}$BTP-H

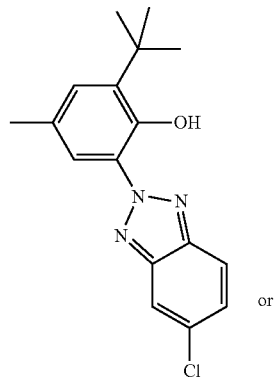

or $^{TMCl}$BTP-H

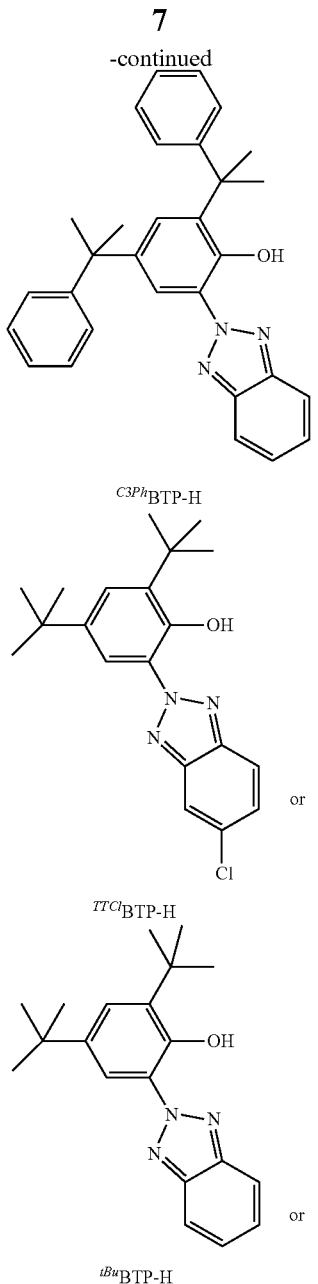

$^{C3Ph}$BTP-H or $^{TTCl}$BTP-H or $^{tBu}$BTP-H

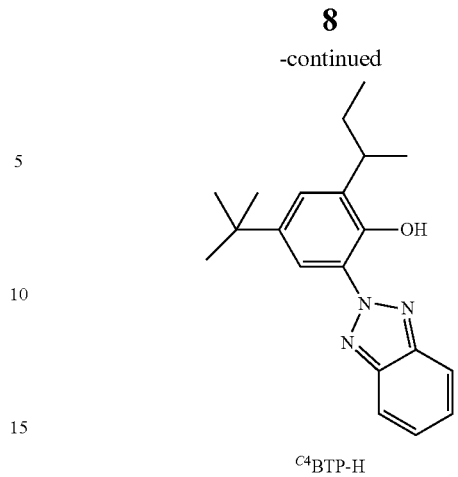

$^{C4}$BTP-H

In an embodiment, for a compound having formula (2), where $R_1$ is H, $R_2$ is —C8H17, $R_3$ is H, the compound is referred to as $^{C8}$BTP-H, which is used for synthesizing the catalyst $(^{C8}BTP)_2Sn$. In an embodiment, for a compound having formula (2), where $R_1$ is H, $R_2$ is -Me, $R_3$ is H, the compound is referred to as $^{Cl}$BTP-H, which is used for synthesizing the catalyst $(^{Cl}BTP)_2Sn$. In an embodiment, for a compound having formula (2), where $R_1$ is -tBu, $R_2$ is -Me, $R_3$ is Cl, the compound is referred to as $^{TMCl}$BTP-H, which is used for synthesizing the catalyst $(^{TMCl}BTP)_2Sn$. In an embodiment, for a compound having formula (2), where $R_1$ is —C3H6Ph, $R_2$ is —C3H6Ph, $R_3$ is H, the compound is referred to as $^{C3Ph}$BTP-H, which is used for synthesizing the catalyst $(^{C3Ph}BTP)_2Sn$. In an embodiment, for a compound having formula (2), where $R_1$ is -tBu, $R_2$ is -tBu, $R_3$ is Cl, the compound is referred to as $^{TTCl}$BTP-H, which is used for synthesizing the catalyst $(^{TTCl}BTP)_2Sn$. In an embodiment, for a compound having formula (2), where $R_1$ is -tBu, $R_2$ is -tBu, $R_3$ is H, the compound is referred to as $^{tBu}$BTP-H, which is used for synthesizing the catalyst $(^{tBu}BTP)_2Sn$. In an embodiment, for a compound having formula (2), where $R_1$ is —C4H9, $R_2$ is -tBu, $R_3$ is H, the compound is referred to as $^{C4}$BTP-H, which is used for synthesizing the catalyst $(^{C4}BTP)_2Sn$.

The various catalysts of the embodiments are synthesized by using various ligands to react with Tin (II) bis[bis(trimethylsilyl)amino], wherein the purity and the yield of each of the synthesized catalysts are shown in Table 1.

TABLE 1

The synthesis result of various catalysts

| Ex. | $^R$BTP-H | [$^R$BTP-H]:[SnA$_2$] | Temp. (° C.) | Time (hr) | Purity (%)$^a$ | Yield (%) |
|---|---|---|---|---|---|---|
| 1 | $^{Cl}$BTP-H | 2:1 | 100-120 | 12-16 | 60 (50~60) | 37 (30~37) |
| 2 | $^{C8}$BTP-H | 2:1 | 40-50 | 12-16 | 97 (90~97) | 90 (85~90) |
| 3 | $^{C3Ph}$BTP-H | 2:1 | 100-120 | 12-16 | ≤5 | ≤5 |
| 4 | $^{tBu}$BTP-H | 2:1 | 40-50 | 12-16 | 98 (95~98) | 86 (78~86) |
| 5 | $^{C4}$BTP-H | 2:1 | 40-50 | 12-16 | 90 (80~90) | 85 (75~85) |
| 6 | $^{TTCl}$BTP-H | 2:1 | 40-50 | 12-16 | 97 (90~97) | 88 (80~88) |
| 7 | $^{TMCl}$BTP-H | 2:1 | 40-50 | 12-16 | 99 (95~99) | 90 (85~90) |

$^a$Obtained from 1H NMR analysis.

As shown in Table 1, in the third example, when $^{C3Ph}$BTP-H is used as a reactant in the synthesis reaction of the catalyst ($^{C3Ph}$BTP)$_2$Sn, the purity and the yield of the catalyst ($^{C3Ph}$BTP)$_2$Sn are not as good as other examples due to steric hindrance.

Figure 2:
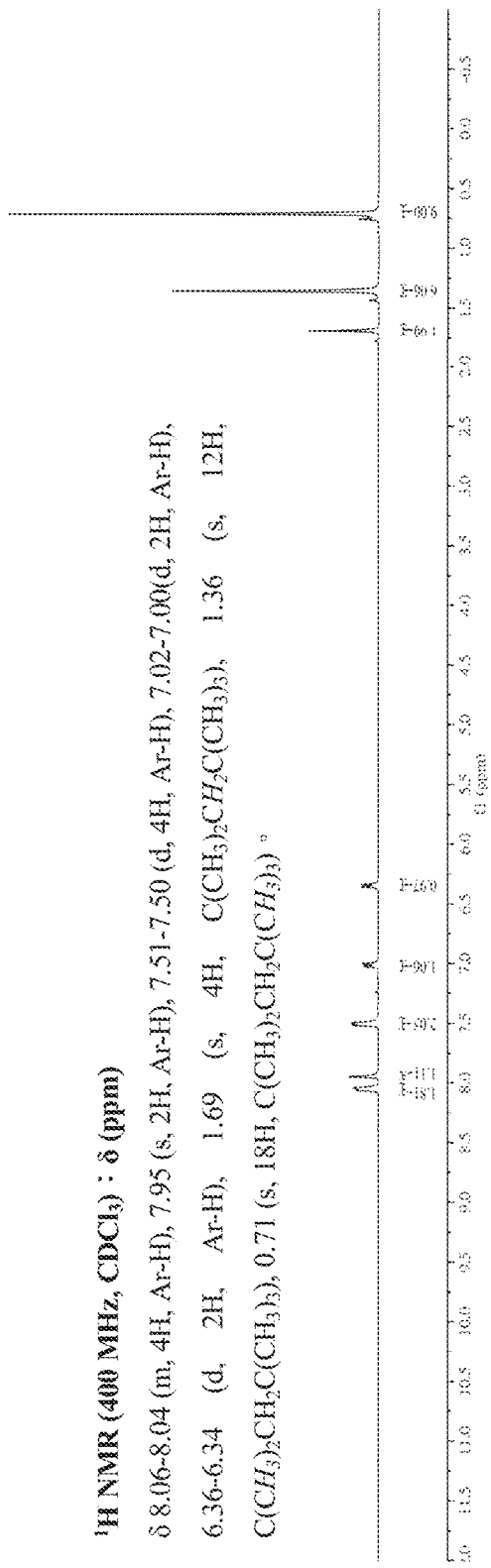
FIG. 2 is a 1H NMR spectrum of the ($^{C8}$BTP)₂Sn catalyst, showing the purity of the synthesized catalyst.

In the second example, $^{C8}$BTP-H is used as a reactant in the synthesis reaction to synthesize the catalyst ($^{C8}$BTP)$_2$Sn, the purity of the catalyst ($^{C8}$BTP)$_2$Sn attains 97%, and the yield thereof attains 90%. The 1H NMR spectrum of the synthesized catalyst ($^{C8}$BTP)$_2$Sn of the second example is shown in FIG. 2.

Figure 3:
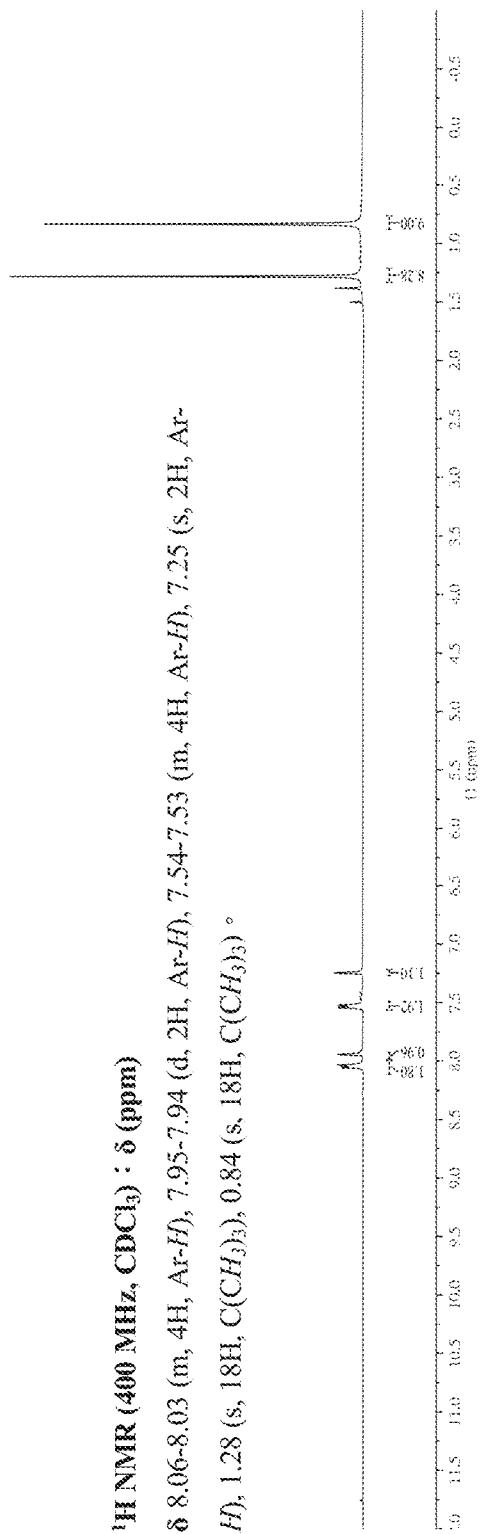
FIG. 3 is a 1H NMR spectrum of the ($^{tBu}$BTP)₂Sn catalyst, showing the purity of the synthesized catalyst.

In the fourth example, $^{tBu}$BTP-H is used as a reactant in the synthesis reaction to synthesize the catalyst ($^{tBu}$BTP)$_2$Sn, the purity of the catalyst ($^{tBu}$BTP)$_2$Sn attains 98%, and the yield thereof attains 86%. The 1H NMR spectrum of the synthesized catalyst ($^{C8}$BTP)$_2$Sn of the fourth example is shown in FIG. 3.

Figure 4:
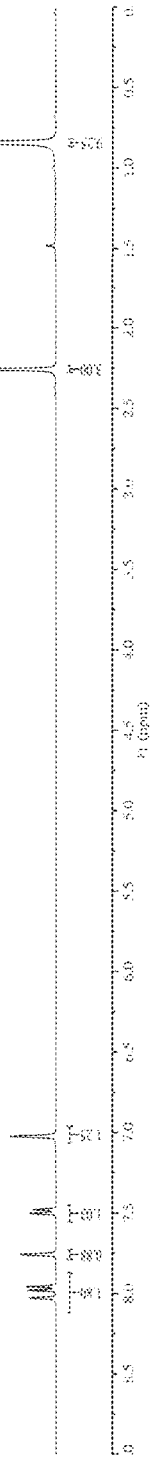
FIG. 4 is a 1H NMR spectrum of the ($^{TMCl}$BTP)₂Sn catalyst, showing the purity of the synthesized catalyst.
Figure 5:
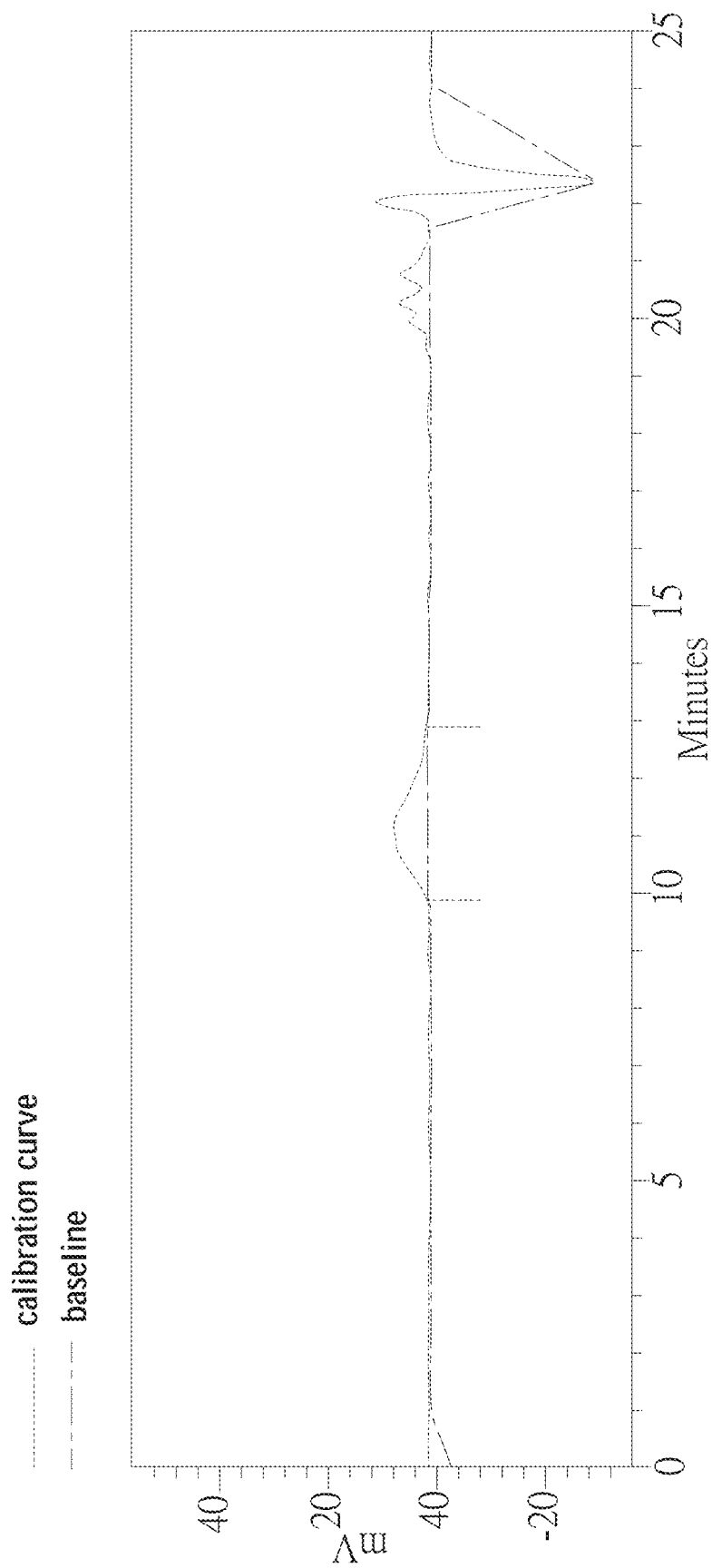
FIG. 5 is a gel-permeation chromatograph (GPC) chromatogram, showing the molecular weight of the polylactic acid (PLA) synthesized in the presence of the ($^{TMCl}$BTP)₂Sn catalyst.

In the seventh example, $^{TMCl}$BTP-H is used as a reactant in the synthesis reaction to synthesize the catalyst ($^{TMCl}$BTP)$_2$Sn, the purity of the catalyst ($^{TMCl}$BTP)$_2$Sn attains 99%, and the yield thereof attains 90%. The 1H NMR spectrum of the synthesized catalyst ($^{TMCl}$BTP)$_2$Sn of the fourth example is shown in FIG. 4.

Additionally, the catalyst ($^{TMCl}$BTP)$_2$Sn of the embodiment is synthesized by using various tin(II) compounds to react with the $^{TMCl}$BTP-H ligand, wherein the purity and the yield of the synthesized catalyst ($^{TMCl}$BTP)$_2$Sn in each of the examples are shown in Table 2.

III. Catalytic Effect of the Catalyst ($^R$BTP)$_2$Sn in the ROP of Lactide

A reaction equation of the ROP of lactide for synthesizing PLA is shown below:

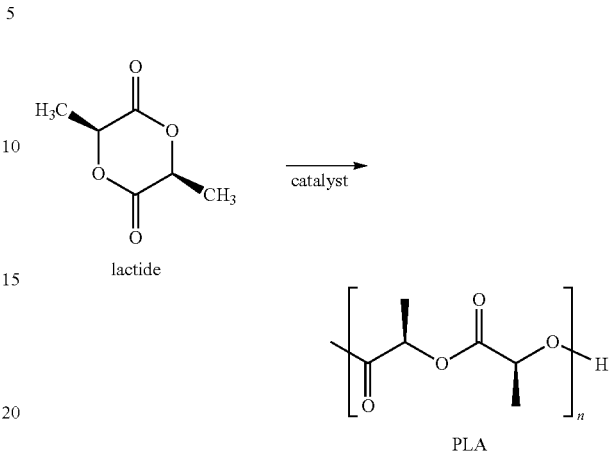

A method of synthesizing polylactic acid (PLA) of an embodiment according to the present invention includes performing a ring-opening polymerization of lactide in a presence of the catalyst having a structure of formula (1) to synthesize PLA.

TABLE 2

The synthesis result of the catalyst ($^{TMCl}$BTP)$_2$Sn by using various tin(II) compounds

| Ex. | $^R$BTP-H | tin(II) compounds | [$^R$BTP-H]:[SnA$_2$] | Temp. (° C.) | Time (hr) | Purity (%)$^a$ | Yield (%) |
|---|---|---|---|---|---|---|---|
| 8 | $^{TMCl}$BTP-H | Tin(II) 2-ethylhexanoate | 2:1 | 40-50 | 12-16 | 97(90~97) | 87(80~87) |
| 9 | $^{TMCl}$BTP-H | tin(II) chloride | 2:1 | 40-50 | 12-16 | 83(75~83) | 41(35~41) |
| 10 | $^{TMCl}$BTP-H | tin(II) sulfate | 2:1 | 40-50 | 12-16 | 65(55~65) | 19(10~19) |

$^a$Obtained from 1H NMR analysis.

In the eighth example, $^{TMCl}$BTP-H is reacted with tin(II) 2-ethylhexanoate to synthesize the catalyst ($^{TMCl}$BTP)$_2$Sn, the purity of the catalyst ($^{TMCl}$BTP)$_2$Sn attains 97%, and the yield thereof attains 87%.

In the ninth example, $^{TMCl}$BTP-H is reacted with tin(II) chloride to synthesize the catalyst ($^{TMCl}$BTP)$_2$Sn, the purity of the catalyst ($^{TMCl}$BTP)$_2$Sn attains 83%, and the yield thereof attains 41%.

In the tenth example, $^{TMCl}$BTP-H is reacted with tin(II) sulfate to synthesize the catalyst ($^{TMCl}$BTP)$_2$Sn, the purity of the catalyst ($^{TMCl}$BTP)$_2$Sn attains 65%, and the yield thereof attains 19%.

By comparing the 7th example in Table 1 with the 8th to 10th examples in Table 2, when $^{TMCl}$BTP-H is reacted with tin(II) bis[bis(trimethylsilyl)amino] (as in the 7th example), the purity and the yield of the synthesized catalyst ($^{TMCl}$BTP)$_2$Sn the greatest among that of other examples. Thus, it is realized that tin(II) bis[bis(trimethylsilyl)amino] is preferred for the synthesis reaction of the compound having formula (1).

The compound having formula (1) could be used as a catalyst for catalyzing the ROP of lactide to promote the efficiency of PLA synthesis and the conversion of lactide in the ROP and to reduce the temperature of the ROP. Additionally, under different reaction conditions, such as different reaction times or different reaction temperatures, the molecular weight of the synthesized PLA could be various.

In the presence of the catalyst having a structure of formula (1), the ROP of lactide could be performed at a temperature between 100° C. and 180° C. Preferably, the ROP of lactide could be performed at a temperature in a range of 120° C. to 160° C., and most preferably in a range of 130° C. and 150° C. When the reaction temperature is lower than 100° C., the reaction time of the ROP of lactide is increased to 1 hour even longer, and the conversion of lactide and the molecular weight of synthesized PLA are reduced. On the other hand, although the ROP of lactide could be performed at a temperature higher than 180° C., the synthesis of PLA may be more energy-consuming. Since the PLA with high molecular weight could also be synthesized when the ROP of lactide is performed at a temperature between 100° C. and 180° C., the ROP of lactide does not need to be performed at a temperature higher than 180° C. to save energy.

More specifically, various catalysts having formula (1) have different catalytic effects on the ROP of lactide, which is illustrated by the examples in Table 3 below.

In each of the examples in Table 3, 0.05 mmoles catalyst is added into 10 mmoles lactide to catalyze the ROP of lactide. At the beginning of the reaction, an equivalent ratio of the catalyst to the lactide, is 1:200. The ROP of lactide is performed at 120° C., a synthesis result of PLA in each of the examples is shown in Table 3.

TABLE 3

The catalytic effect of each of the various catalysts on the ROP of lactide at 120° C.

| Exp. | Catalyst | [catalyst]$_0$:[L-LA.]$_0$ | Temp. (° C.) | Time (min) | Conv. (%)$^a$ | MW$^b$ (Da) |
|---|---|---|---|---|---|---|
| 3-1 | Commercial catalyst: Sn(Oct)$_2$ | 1:200 | 120 | 5 | 0 | N.D. |
| 3-2 | Commercial catalyst: Sn[(N(TMS)$_2$]$_2$ | 1:200 | 120 | 5 | 0 | N.D. |
| 3-3 | [($^{C8}$BTP)$_2$Sn] | 1:200 | 120 | 5 | 16 | 19,700 |
| 3-4 | [($^{C8}$BTP)$_2$Sn] | 1:200 | 120 | 10 | 37 | 56,700 |
| 3-5 | [($^{tBu}$BTP)$_2$Sn] | 1:200 | 120 | 5 | 28 | 50,800 |
| 3-6 | [($^{tBu}$BTP)$_2$Sn] | 1:200 | 120 | 10 | 50 | 108,900 |
| 3-7 | [($^{TMCl}$BTP)$_2$Sn] | 1:200 | 120 | 5 | 55 | 308,900 |
| 3-8 | [($^{TMCl}$BTP)$_2$Sn] | 1:200 | 120 | 10 | 90 | 1,390,353 |
| 3-9 | [($^{TTCl}$BTP)$_2$Sn] | 1:200 | 120 | 5 | 42 | 206,700 |
| 3-10 | [($^{TTCl}$BTP)$_2$Sn] | 1:200 | 120 | 10 | 78 | 584,900 |
| 3-11 | [($^{C3Ph}$BTP)$_2$Sn] | 1:200 | 120 | 5 | N.D | N.D |
| 3-12 | [($^{C3Ph}$BTP)$_2$Sn] | 1:200 | 120 | 10 | N.D | N.D |

$^a$Obtained from 1H NMR analysis.
$^b$MW: molecular weight which is determined by GPC analysis with polystyrene as the standard in THF.

In examples 3-1 and 3-2, the catalysts are the commercial and conventional catalysts. It is known that the ROP of lactide could be performed at a temperature between 180° C. and 220° C. in a presence of the commercial catalyst to synthesize PLA. However, in the examples 3-1 and 3-2, the ROP is performed at 120° C. for 5 minutes, so that PLA can not be synthesized, and the conversion of lactide and the molecular weight of PLA can not be measured.

In examples 3-3 to 3-12, the ROP of lactide is performed in a presence of various catalysts of the embodiments of the present invention. As shown in Table 2, the ROP of lactide could be performed in the presence of any of the catalysts ($^{C8}$BTP)$_2$Sn, ($^{tBu}$BTP)$_2$Sn, ($^{TMCl}$BTP)$_2$Sn, and ($^{TTCl}$BTP)$_2$Sn at 120° C. However, the ROP of lactide can not be performed in presence of the catalyst ($^{C3Ph}$BTP)$_2$Sn to synthesize PLA at 120° C. for either 5 minutes or 10 minutes.

Regarding examples 3-3, 3-5, 3-7, and 3-9, the catalysts are ($^{C8}$BTP)$_2$Sn, ($^{tBu}$BTP)$_2$Sn, ($^{TMCl}$BTP)$_2$Sn, and ($^{TTCl}$BTP)$_2$Sn, respectively. Comparing with the examples 3-1 and 3-2, when the ROP of lactide is performed at 120° C. for 5 minutes and is catalyzed by the catalyst having formula (1), the molecular weight of the synthesized PLA is in a range of 19,700 Da to 308,900 Da, and the conversion of the lactide is in a range of 16% to 55%.

Regarding examples 3-4, 3-6, 3-8, and 3-10, the catalysts are ($^{C8}$BTP)$_2$Sn, ($^{tBu}$BTP)$_2$Sn, ($^{TMCl}$BTP)$_2$Sn, and ($^{TTCl}$BTP)$_2$Sn, respectively. Comparing with the examples 3-3, 3-5, 3-7, and 3-9, when the ROP of lactide is performed at 120° C. for 10 minutes and is catalyzed by the catalyst having formula (1), the molecular weight of the synthesized PLA is in a range of 56,700 Da to 1,390,353 Da, and the conversion of the lactide is in a range of 37% to 90%. Thus, it is known that, when the ROP of lactide is performed at the same temperature and catalyzed by the same catalyst having formula (1), the reaction time could be increased to promote the conversion of lactide and the molecular weight of synthesized PLA.

As shown in Table 2, the synthesis result of PLA in the example 3-8 is the best among the examples 3-3 to 3-12. The molecular weight of the synthesized PLA that is measured by means of gel permeation chromatography (GPC) is 1,390,353 Da, wherein the GPC chromatogram thereof is shown in FIG. 6. Additionally, in the example 3-8, the conversion of lactide is 90%.

To sum up, the catalysts having formula (1) of the embodiments could significantly reduce the reaction temperature of the ROP of lactide and accelerate the synthesis of PLA, so that PLA with high molecular weight could be synthesized at a low temperature within a short period of time. Therefore, a sequence of the four catalysts of the abovementioned examples according to a catalytic effect is ($^{TMCl}$BTP)$_2$Sn, ($^{TTCl}$BTP)$_2$Sn, ($^{tBu}$BTP)$_2$Sn, and ($^{C8}$BTP)$_2$Sn.

Additionally, when the reaction temperature of the ROP of lactide is raised from 120° C. to 150° C., the catalytic effect of the catalyst having formula (1) could be enhanced. Please refer to Table 4 below.

TABLE 4

The catalytic effect of each of the various catalysts on the ROP of lactide at 150° C.

| Exp. | Catalyst | [catalyst]$_0$:[L-LA.]$_0$ | Temp. (° C.) | Time (min) | Conv. (%)$^a$ | MW$^b$ (Da) |
|---|---|---|---|---|---|---|
| 3-13 | [($^{C8}$BTP)$_2$Sn] | 1:200 | 150 | 10 | 95 | 100,500 |
| 3-14 | [($^{tBu}$BTP)$_2$Sn] | 1:200 | 150 | 10 | 95 | 260,200 |
| 3-15 | [($^{TTCl}$BTP)$_2$Sn] | 1:200 | 150 | 10 | 90 | 694,900 |
| 3-16 | [($^{C3Ph}$BTP)$_2$Sn] | 1:200 | 150 | 60 | 16 | 13,100 |

$^a$Obtained from 1H NMR analysis.
$^b$MW: molecular weight which is determined by GPC analysis with polystyrene as the standard in THF.

In example 3-13, the ROP of lactide is performed at 150° C. for 10 minutes in the presence of ($^{C8}$BTP)$_2$Sn, the molecular weight of the synthesized PLA is 100,500 Da, and the conversion of lactide is 95%. Comparing with the example 3-4 in Table 2, the molecular weight of the synthesized PLA and the conversion of lactide are both promoted. The conversion of lactide attains 95%, so that the purity of PLA is effectively promoted.

In example 3-14, the ROP of lactide is performed at 150° C. for 10 minutes in the presence of ($^{tBu}$BTP)$_2$Sn, the molecular weight of the synthesized PLA is 260,200 Da, and the conversion of lactide is 95%. Comparing with the example 3-6 in Table 2, the molecular weight of the synthesized PLA and the conversion of lactide are both promoted. The conversion rate of lactide attains 95%, so that the purity of PLA is effectively promoted.

In example 3-15, the ROP of lactide is performed at 150° C. for 10 minutes in the presence of ($^{TTCl}$BTP)$_2$Sn, the molecular weight of the synthesized PLA is 694,900 Da, and the conversion of lactide is 90%. Comparing with the example 3-10 in Table 2, the molecular weight of the synthesized PLA and the conversion of lactide are both promoted. The conversion rate of lactide attains 90%, so that the purity of PLA is effectively promoted.

In examples 3-16, the ROP of lactide is performed at 150° C. for 10 minutes in the presence of ($^{C3Ph}$BTP)$_2$Sn, the molecular weight of the synthesized PLA is 13,100 Da, and the conversion of lactide is 16%. Comparing with the example 3-12 in Table 2, the molecular weight of the synthesized PLA and the conversion of lactide are both promoted. Thus, the catalyst ($^{C3Ph}$BTP)$_2$Sn could effectively reduce the reaction temperature of ROP of lactide to a temperature lower than 180° C.

IV. Method of Synthesizing PLA in a One-Pot Manner

Except for adding the catalyst having formula (1) to catalyze the ROP of lactide to synthesize PLA, the PLA could be synthesized in a one-pot manner. In other words, the catalyst and the PLA could be synthesized in the same reaction vessel. The ligand having the structure of formula (2) and the tin compound reacts in the reaction vessel, and then add lactide into the same reaction vessel to synthesize PLA.

A method of synthesizing polylactic acid in a one-pot manner, including the following steps.

Step A): The ligand having the structure of formula (2) and the tin compound (SnA$_2$) are added into a reaction vessel to synthesize the catalyst having the structure of formula (1).

Step B): The lactide is added into the reaction vessel to perform a ring-opening polymerization to synthesize PLA, wherein an equivalent ratio of the ligand having the structure of formula (2) to the tin compound is 2:1 to 2.5:1, and an equivalent ratio of the tin compound to lactide is 1:200.

In the one-pot PLA synthesizing method, the tin compound is a tin(II) compound. Since the reactivity of tin(II) is greater than the reactivity of tin (IV), the tin(II) compound is more easily to react with other substances. Thus, using the tin(II) compound to synthesize the compound having formula (1) could obtain a better result (e.g. increasing the amount of the product). The tin(II) compound is selected from a group consisting of tin(II) 2-ethylhexanoate, tin(II) bis[bis(trimethylsilyl)amino], tin(II) chloride, and tin(II) sulfate.

In the one-pot PLA synthesizing method, the ligand having formula (2) could react with the tin compound (SnA$_2$) to synthesize the catalyst having the structure of formula (1). The catalyst having formula (1) further catalyzes the ROP of lactide to obtain PLA. The reaction equation of the one-pot synthesis of PLA is shown below:

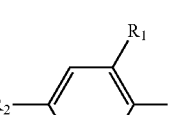

Formula (2)

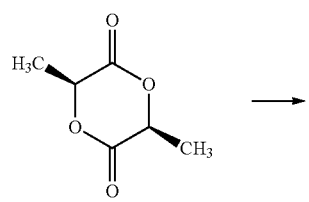

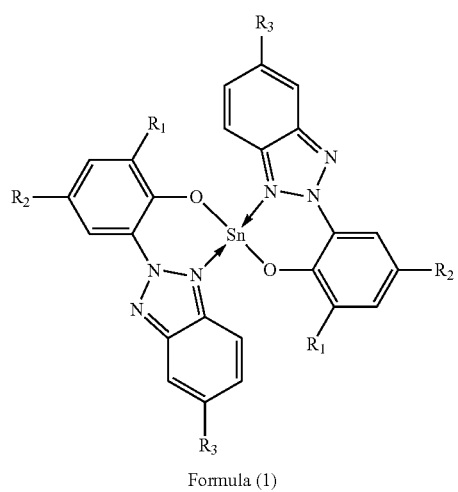

Formula (1)

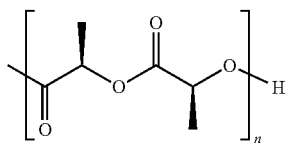

In the one-pot PLA synthesizing method, the synthesis of the catalyst having formula (1) is performed at a temperature in a range of 40° C. to 180° C. for a time up to 30 minutes. After the lactide is added, the ROP of lactide is performed at a temperature between 100° C. and 180° C. Preferably, the ROP of lactide could be performed at a temperature in a range of 120° C. to 160° C., and most preferably in a range of 140° C. and 160° C. Additionally, after the ROP of lactide is performed for a time between 5 minutes and 60 minutes, the molecular weight of PLA could be greater than 10,000 Da. Preferably, the molecular weight of PLA could be greater than 100,000 Da, and most preferably greater than 1,000,000 Da.

In the one-pot PLA synthesizing method, by adding various ligands having formula (2), the catalytic effect on the ROP of lactide is different, which is shown in the following examples in Table 5.

In each of the examples of Table 5, 0.1 mmoles ligand having formula (2) and 0.05 mmoles tin(II) 2-ethylhexanoate are put in a reaction vessel to react at 120° C. for 30 minutes to synthesize the catalyst having formula (1). Then, 10 mmoles lactide is added into the same reaction vessel to perform ROP. The reaction temperature and reaction time of the ROP in each of the examples is shown in Table 5. Additionally, the synthesis result of PLA is also shown in Table 5.

C. for 60 minutes. The conversion of lactide is 8% to 42%, and the molecular weight of PLA is in a range of 9,870 Da to 56,900 Da.

In examples 4-2, 4-6, 4-14, 4-18, 4-22, and 4-26, the ROP of lactide in the one-pot PLA synthesis is performed at 140° C. for 30 minutes. The conversion of lactide is 9% to 49%, and the molecular weight of PLA is in a range of 10,300 Da to 130,000 Da. Comparing with the examples 4-1, 4-5, 4-13, 4-17, 4-21, and 4-25, when the reaction temperature is raised from 120° C. to 140° C., even the reaction time is halved to 30 minutes, the synthesis result of PLA remains the same or becomes better.

In examples 4-3, 4-7, 4-15, 4-19, 4-23, and 4-27, the ROP of lactide in the one-pot PLA synthesis is performed at 160° C. for 10 minutes. The conversion of lactide is 12% to 85%, and the molecular weight of PLA is in a range of 13,900 Da to 1,000,427 Da. Additionally, in examples 4-4, 4-8, 4-16, 4-20, 4-24, and 4-28, the ROP of lactide in the one-pot PLA synthesis is performed at 160° C. for 5 minutes. The conversion of lactide is 10% to 70%, and the molecular weight of PLA is in a range of 12,900 Da to 877,000 Da.

TABLE 5

The synthesis result of the one-pot PLA synthesizing method by using various ligands

| Exp | ligand | [$^R$BTP-H]:[SnA$_2$]:[L-LA]$_0$ | Temp. (° C.) | Time (min) | Conv. (%) [a] | MW[b] (Da) |
|---|---|---|---|---|---|---|
| 4-1 | $^{C1}$BTP-H | 2:1:200 | 120 | 60 | 8 | 9,870 |
| 4-2 | $^{C1}$BTP-H | 2:1:200 | 140 | 30 | 9 | 10,300 |
| 4-3 | $^{C1}$BTP-H | 2:1:200 | 160 | 10 | 12 | 13,900 |
| 4-4 | $^{C1}$BTP-H | 2:1:200 | 160 | 5 | 10 | 12,900 |
| 4-5 | $^{C8}$BTP-H | 2:1:200 | 120 | 60 | 11 | 11,300 |
| 4-6 | $^{C8}$BTP-H | 2:1:200 | 140 | 30 | 12 | 14,400 |
| 4-7 | $^{C8}$BTP-H | 2:1:200 | 160 | 10 | 15 | 19,700 |
| 4-8 | $^{C8}$BTP-H | 2:1:200 | 160 | 5 | 14 | 17,600 |
| 4-9 | $^{C3Ph}$BTP-H | 2:1:200 | 120 | 60 | 0 | N.D |
| 4-10 | $^{C3Ph}$BTP-H | 2:1:200 | 140 | 30 | 0 | N.D |
| 4-11 | $^{C3Ph}$BTP-H | 2:1:200 | 160 | 10 | 0 | N.D |
| 4-12 | $^{C3Ph}$BTP-H | 2:1:200 | 160 | 5 | 0 | N.D |
| 4-13 | $^{tBu}$BTP-H | 2:1:200 | 120 | 60 | 19 | 33,800 |
| 4-14 | $^{tBu}$BTP-H | 2:1:200 | 140 | 30 | 21 | 41,900 |
| 4-15 | $^{tBu}$BTP-H | 2:1:200 | 160 | 10 | 30 | 50,700 |
| 4-16 | $^{tBu}$BTP-H | 2:1:200 | 160 | 5 | 27 | 48,100 |
| 4-17 | $^{C4}$BTP-H | 2:1:200 | 120 | 60 | 24 | 53,800 |
| 4-18 | $^{C4}$BTP-H | 2:1:200 | 140 | 30 | 27 | 59,100 |
| 4-19 | $^{C4}$BTP-H | 2:1:200 | 160 | 10 | 33 | 67,900 |
| 4-20 | $^{C4}$BTP-H | 2:1:200 | 160 | 5 | 29 | 62,500 |
| 4-21 | $^{TTCl}$BTP-H | 2:1:200 | 120 | 60 | 38 | 34,100 |
| 4-22 | $^{TTCl}$BTP-H | 2:1:200 | 140 | 30 | 44 | 79,000 |
| 4-23 | $^{TTCl}$BTP-H | 2:1:200 | 160 | 10 | 70 | 500,800 |
| 4-24 | $^{TTCl}$BTP-H | 2:1:200 | 160 | 5 | 60 | 133,000 |
| 4-25 | $^{TMCl}$BTP-H | 2:1:200 | 120 | 60 | 42 | 56,900 |
| 4-26 | $^{TMCl}$BTP-H | 2:1:200 | 140 | 30 | 49 | 130,000 |
| 4-27 | $^{TMCl}$BTP-H | 2:1:200 | 160 | 10 | 85 | 1,000,427 |
| 4-28 | $^{TMCl}$BTP-H | 2:1:200 | 160 | 5 | 70 | 877,000 |

[a] Obtained from 1H NMR analysis.
[b] MW: molecular weight which is determined by GPC analysis with polystyrene as the standard in THF.

In examples 4-9 to 4-12, when the ligand having formula (2) is $^{C3Ph}$BTP-H, $^{C3Ph}$BTP-H is hard to react with tin compound due to steric hindrance to synthesize the catalyst ($^{C3Ph}$BTP)$_2$Sn. Therefore, the ROP of lactide can not be catalyzed effectively, so that the conversion of lactide is 0%, and the molecular weight of PLA can not be measured.

In examples 4-1, 4-5, 4-13, 4-17, 4-21, and 4-25, the ROP of lactide in the one-pot PLA synthesis is performed at 120°

As shown the examples 4-23, 4-24, 4-26, and 4-27 in Table 5, when the ligand having formula (2) is $^{TTCl}$BTP-H or $^{TMCl}$BTP-H, the conversion of lactide attains 60% to 85%, and the molecular weight of PLA is more than 100,000 Da, even attains 1,000,000 Da. As a result, when R$_3$ of the ligand having formula (2) is chlorine (R$_3$=Cl), the synthesized catalysts have a better catalytic effect.

Additionally, it is realized from Table 5, when the reaction temperature and the reaction time of ROP remain the same, using $^{TMCl}$BTP-H as the ligand in the one-pot PLA synthesizing method could promote the conversion of lactide and the molecular weight of PLA.

As shown in Table 6 below, the ligand in each of the examples is $^{TMCl}$BTP-H, which is a ligand with the best catalytic effect according to the comparison in Table 5. The tin compound used in the one-pot PLA synthesizing method varies in each of the examples in Table 6 to show the impact of the tin compound on the one-pot PLA synthesized method. In each of the examples in Table 6, 0.1 mmoles ligand $^{TMCl}$BTP-H and 0.05 mmoles tin compound are put into one reaction vessel to react at 120° C. for 30 minutes to synthesize the catalysts. Then, 10 mmoles lactide is added into the same reaction vessel to perform the ROP of lactide. The reaction temperature and reaction time of the ROP in each of the examples are shown in Table 6. Additionally, the synthesis result of PLA is also shown in Table 6.

TABLE 6

The synthesis result of the one-pot PLA synthesizing method by using various tin compound

| Exp. | Tin compound | [$^{TMCl}$BTP-H]:[SnA$_2$]:[L-LA]$_0$ | Temp. (° C.) | Time (min) | Conv. (%)$^a$ | MW$^b$ (Da) |
|---|---|---|---|---|---|---|
| 4-29 | tin(II) bis[bis(trimethylsilyl)amino] | 2:1:200 | 120 | 60 | 30 | 49,900 |
| 4-30 | tin(II) chloride | 2:1:200 | 120 | 60 | 19 | 24,100 |
| 4-31 | tin(II) sulfate | 2:1:200 | 120 | 60 | 9 | 12,300 |
| 4-32 | tin(II) bis[bis(trimethylsilyl)amino] | 2:1:200 | 140 | 30 | 35 | 98,400 |
| 4-33 | tin(II) chloride | 2:1:200 | 140 | 30 | 25 | 72,700 |
| 4-34 | tin(II) sulfate | 2:1:200 | 140 | 30 | 9 | 23,300 |

$^a$ Obtained from 1H NMR analysis.
$^b$MW: molecular weight which is determined by GPC analysis with polystyrene as the standard in THF.

In examples 4-29 to 4-31, using tin(II) bis[bis(trimethylsilyl)amino], tin(II) chloride, and tin(II) sulfate as the tin compound in the one-pot PLA synthesizing method to react at 120° C. for 60 minutes, the conversion of lactide is in a range of 9% to 30%, and the molecular weight of PLA is in a range of 12,300 Da to 49,900 Da. As shown in the example 4-25 in Table 5, when tin(II) 2-ethylhexanoate is used as the tin compound to react at 120° C. for 60 minutes, the conversion of lactide is 42%, and the molecular weight of PLA is 56,900 Da. Thus, when the tin compound of the one-pot PLA synthesizing method is tin(II) 2-ethylhexanoate, the synthesis result of PLA is better than that of using other tin compounds.

In examples 4-32 to 4-34, using tin(II) bis[bis(trimethylsilyl)amino], tin(II) chloride, and tin(II) sulfate as the tin compound in the one-pot PLA synthesizing method to react at 140° C. for 30 minutes, the conversion of lactide is in a range of 9% to 35%, and the molecular weight of PLA is in a range of 23,300 Da to 98,400 Da. As shown in the example 4-26 in Table 5, when tin(II) 2-ethylhexanoate is used as the tin compound to react at 140° C. for 30 minutes, the conversion of lactide is 49%, and the molecular weight of PLA is 130,000 Da. Thus, when the tin compound of the one-pot PLA synthesizing method is tin(II) 2-ethylhexanoate, the synthesis result of PLA is better than that of using other tin compounds.

Therefore, in the one-pot PLA synthesizing method, comparing with tin(II) bis[bis(trimethylsilyl)amino], tin(II) chloride, and tin(II) sulfate, using tin(II) 2-ethylhexanoate as the tin compound is preferred.

It must be pointed out that the embodiment described above is only a preferred embodiment of the present invention. All equivalent structures and methods which employ the concepts disclosed in this specification and the appended claims should fall within the scope of the present invention.

What is claimed is:

1. A compound having a structure of formula (1),

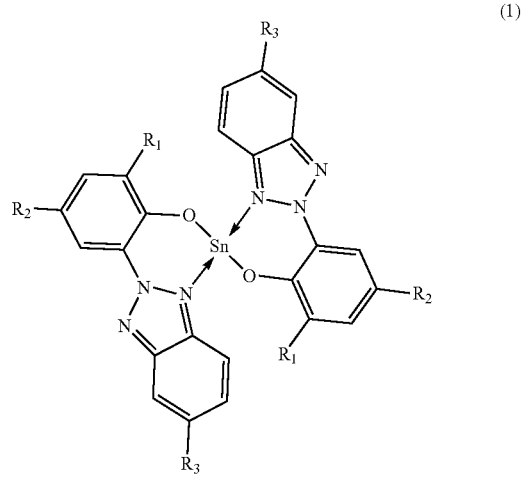

wherein $R_1$ is selected from a group consisting of hydrogen and a hydrocarbon functional group with a number of carbon atoms from 1 to 9;

R₂ is selected from a group consisting of a hydrocarbon functional group with a number of carbon atoms from 1 to 9;

R₃ is hydrogen or chlorine.

2. The compound as claimed in claim 1, wherein R1 is hydrogen, tert-Butylphenyl, propylphenyl, or butyl; the is octyl, methyl, propylphenyl, or tert-Butylphenyl.

3. The compound as claimed in claim 1, wherein R1 is tert-Butylphenyl; R2 is methyl; R3 is chlorine.

4. A process for preparing the compound as claimed in claim 1, comprising:

reacting a compound having a structure of formula (2),

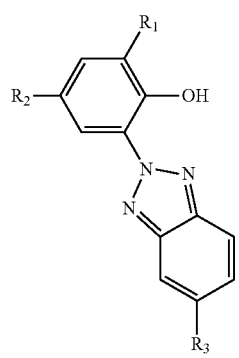

(2)

wherein R₁ is selected from a group consisting of hydrogen and a hydrocarbon functional group with a number of carbon atoms from 1 to 9; R₂ is selected from a group consisting of a hydrocarbon functional group with a number of carbon atoms from 1 to 9; R₃ is hydrogen or chlorine, with a tin(II) compound in a solvent to synthesize the compound as claimed in claim 1, wherein at the beginning of the reaction, an equivalent ratio of the compound having the structure of formula (2) to the tin(II) compound is from 2:1 to 8:1.

5. The process as claimed in claim 4, wherein the reaction is performed at a temperature between 40° C. and 120° C.; the solvent is selected from a group consisting of toluene, ethyl ethanoate, n-hexane, diethyl ether, and tetrahydrofuran.

6. The process as claimed in claim 4, the tin(II) compound is tin(II) 2-ethylhexanoate, tin(II) bis[bis(trimethylsilyl)amino], tin(II) chloride, or tin(II) sulfate.

7. A method of synthesizing polylactic acid (PLA), comprising:

performing a ring-opening polymerization of lactide in a presence of a catalyst having a structure of formula (1) to synthesize PLA,

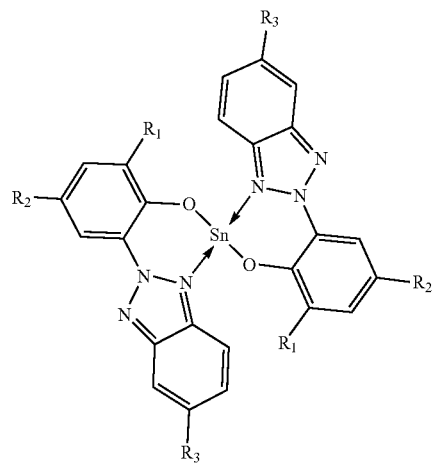

(1)

wherein R₁ is selected from a group consisting of hydrogen and a hydrocarbon functional group with a number of carbon atoms from 1 to 9; R₂ is selected from a group consisting of a hydrocarbon functional group with a number of carbon atoms from 1 to 9; R₃ is hydrogen or chlorine.

8. The method as claimed in claim 7, wherein the ring-opening polymerization is performed at a temperature between 100° C. and 180° C.

9. The method as claimed in claim 8, wherein at the beginning of the ring-opening polymerization, an equivalent ratio of the catalyst having the structure of formula (1) to the lactide is 1:200; R₁ of the catalyst having the structure of formula (1) is hydrogen or tert-Butylphenyl; R₂ of the catalyst having the structure of formula (1) is octyl, tert-Butylphenyl, or methyl.

10. The method as claimed in claim 9, wherein after the ring-opening polymerization is performed at 120° C. for 5 minutes, a molecular weight of the synthesized PLA is in a range of 19,700 Da to 308,900 Da, and a conversion of lactide is in a range of 16% to 55%.

11. The method as claimed in claim 9, wherein after the ring-opening polymerization is performed at 120° C. for 10 minutes, a molecular weight of the synthesized PLA is in a range of 56,700 Da to 1,390,353 Da, and a conversion of lactide is in a range of 37% to 90%.

12. The method as claimed in claim 9, wherein R₃ of the catalyst having the structure of formula (1) is chlorine; after the ring-opening polymerization is performed at a temperature above 120° C., a molecular weight of the synthesized PLA is in excess of 100,000 Da.

13. The method as claimed in claim 9, wherein when the ring-opening polymerization is performed at a temperature between 150° C. and 180° C., a molecular weight of the synthesized PLA is in excess of 100,000 Da.

14. A method of synthesizing polylactic acid (PLA), comprising:

A) adding a ligand having a structure of formula (2),

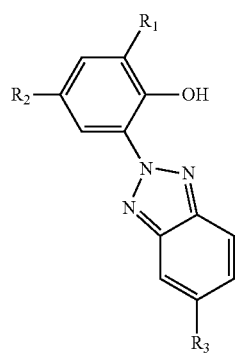

(2)

wherein $R_1$ is selected from a group consisting of hydrogen and a hydrocarbon functional group with a number of carbon atoms from 1 to 9; $R_2$ is selected from a group consisting of a hydrocarbon functional group with a number of carbon atoms from 1 to 9; $R_3$ is hydrogen or chlorine, and a tin compound into a reaction vessel to synthesize a catalyst having a structure of formula (1),

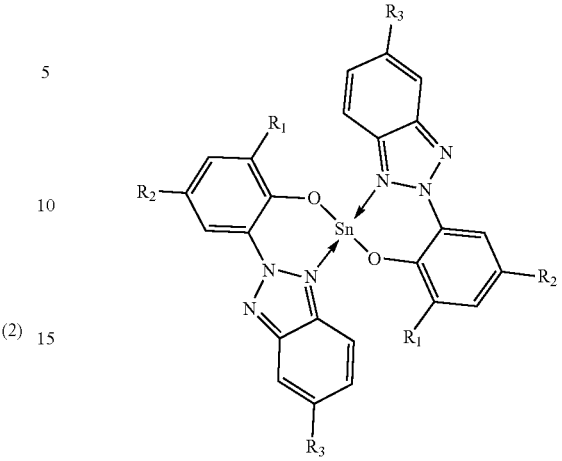

(1)

wherein $R_1$ is selected from a group consisting of hydrogen and a hydrocarbon functional group with a number of carbon atoms from 1 to 9; $R_2$ is selected from a group consisting of a hydrocarbon functional group with a number of carbon atoms from 1 to 9; $R_3$ is hydrogen or chlorine;

B) adding lactide into the reaction vessel to perform a ring-opening polymerization to synthesize PLA.

15. The method as claimed in claim 14, wherein in the step A, the synthesis of the catalyst having the structure of formula (1) is performed at a temperature between 40° C. and 180° C.; in the step B, the ring-opening polymerization is performed at a temperature between 100° C. and 180° C.

16. The method as claimed in claim 14, wherein the temperature of the synthesis of the catalyst: having the structure of formula (1) in the step A is equal to the temperature of the ring-opening polymerization in the step B; the reaction temperature of the method of synthesizing PLA is in a range of 100° C. to 180° C.

17. The method as claimed in claim 14, wherein an equivalent ratio of the ligand having the structure of formula (2) to the tin compound is 2:1 to 2.5:1, and an equivalent ratio of the tin compound to lactide is 1:200.

18. The method as claimed in claim 17, wherein the tin compound is tin(II) 2-ethylhexanoate, tin(II) bis[bis(trimethylsilyl)amino], tin(II) chloride, or tin(II) sulfate.

19. The method as claimed in claim 16, wherein a molecular weight of the synthesized PLA is over 100,000 Da.

* * * * *